United States Patent [19]

Hamaekers et al.

[11] Patent Number: 5,102,105
[45] Date of Patent: Apr. 7, 1992

[54] HYDRAULICALLY DAMPED ENGINE MOUNT

[75] Inventors: Arno Hamaekers, Gorxheimertal; Werner Hettler, Mannheim; Arnold Simuttis, Kreuznach, all of Fed. Rep. of Germany

[73] Assignee: Firma Carl Freudenberg, Weinheim/Bergstr, Fed. Rep. of Germany

[21] Appl. No.: 614,461

[22] Filed: Nov. 15, 1990

[30] Foreign Application Priority Data

Dec. 2, 1989 [DE] Fed. Rep. of Germany ....... 3940004

[51] Int. Cl.$^5$ ............................................. F16M 1/00
[52] U.S. Cl. ............................. 267/140.1 A; 267/219; 248/562; 248/636; 180/902
[58] Field of Search ............ 267/140.1 A, 219; 248/562, 636; 180/300, 312, 901, 902

[56] References Cited

U.S. PATENT DOCUMENTS

| | | | |
|---|---|---|---|
| 4,288,063 | 9/1981 | Brenner | 267/140.1 |
| 4,645,188 | 2/1987 | Jordens | 267/140.1 |

FOREIGN PATENT DOCUMENTS

| | | | |
|---|---|---|---|
| 0091246 | 10/1983 | European Pat. Off. | 267/140.1 |
| 2727244 | 1/1978 | Fed. Rep. of Germany. | |
| 3737252 | 5/1989 | Fed. Rep. of Germany. | |
| 2172083 | 9/1986 | United Kingdom | 267/140.1 |

*Primary Examiner*—Joseph F. Peters, Jr.
*Assistant Examiner*—Christopher P. Ellis
*Attorney, Agent, or Firm*—Sprung Horn Kramer & Woods

[57] ABSTRACT

A hydraulically damped engine mount comprises liquid-filled working and equalization chambers 1, 2 which are separated by a resilient partition wall 3 and connected by a damping opening 4. The axially opposing working chamber 1 and the equalization chamber 2 are bounded by essentially non-deformable pistons, the latter being connected to a centrally disposed, annular fitting by means of an liquid-impermeable and elastically deformable annular body. These pistons are rigidly joined to one another by means of a connecting rod 7. The piston 9 bounding the equalization chamber 2 has a piston surface which is at least as large as the piston surface of the partition wall 3. The annular body corresponding to this piston is a first rolling membrane 6 which is curved in the axial direction toward the outside and the partition wall 3 is a second rolling membrane which is curved in the axial direction to extend into the working chamber 1. At its inside, this second rolling membrane is affixed liquid-tight to the connecting rod 7.

7 Claims, 3 Drawing Sheets

HYDRAULICALLY DAMPED ENGINE MOUNT

BACKGROUND OF THE INVENTION

The invention relates to a hydraulically damped engine mount comprising liquid filled working and equalization chambers which are separated by a resilient partition wall and connected by a damping opening. Opposing one another, the working and equalization chambers are bounded toward the outside by essentially non-deformable pistons. A liquid-impermeable and elastically deformable annular body connects each of these pistons to a centrally disposed, annular fitting. A connecting rod, which penetrates the partition wall parallel to the moving direction in the area of an opening, rigidly connects the pistons. The partition wall is externally affixed to the fitting.

An engine mount of this type is known from the German Patent Publication No. OS 27 27 244. The resulting isolation of engine-induced, acoustically interfering vibrations is less than satisfactory.

SUMMARY OF THE INVENTION

It is therefore an object of the present invention to provide an engine mount of the aforementioned type with improved isolation of acoustically interfering, engine-induced vibrations.

This object, as well as other objects which will become apparent in the discussion that follows, are achieved in accordance with the present invention with an engine mount in which the piston bounding the equalization chamber has a piston surface that is at least as large as the piston surface of the partition wall. Further, the annular body provided in the area of the equalization chamber between the piston and the fitting is a first rolling membrane which is curved in the axial direction toward the outside. The partition wall is a second rolling membrane which is curved in the axial direction to extend into the working chamber; this second rolling membrane is affixed to the connecting rod in a liquid-impermeable connection in the area of the opening.

Due to the configuration of the engine mount in accordance with the invention, loads in are exclusively supported by the resilient properties of one single, elastic annular body bounding the working chamber. Even when tilted during installation, there will be no internal strains directed against one another. Engine-induced, acoustically interfering vibrations of higher frequencies can thus be excellently isolated.

In the event that road-induced vibrations of a great amplitude are introduced, due to its large cross section, the piston bounding the equalization chamber limits the quantity of liquid particles pressed through the damping opening. Vibrations or this kind are thus excellently damped.

The piston bounding the equalization chamber and the first rolling membrane can join one another as one piece and be made of rubber, for example. Manufacture is thus substantially simplified.

It has proved expedient to provide the piston with a reinforcement: for example, a reinforcement plate which is included in the interior by means of vulcanization. In addition to an improved dimensional stability, the dimensionally stable connection to the connecting rod can also be more readily established.

In the area of the opening, the partition wall can be bounded by an enlargement. This enlargement can be elastically widened and, by to an internal prestress, can be pressed against the connecting rod. The use of secondary sealing means to obtain a liquid-tight connection between the partition wall and the connecting rod can thus be omitted in this case.

The connection is particularly tight when the enlargement contacts the connecting rod in the area of a groove having a matching profile. Subsequently, the enlargement and the connecting rod are immovably attached to each other in the axial direction. This is of great advantage in maintaining the engine mount operating characteristics substantially constant over a long period of time.

In another embodiment, the enlargement contacts the connecting rod in the area of a cylindrical segment and can be moved relative thereto in case there are extreme excursions. This prevents undesired damage to the partition wall.

The piston bounding the equalization chamber can be disposed between the fitting stops so that it is only movable between them. Vibrations of an excessive amplitude, and particularly a bursting of the annular body, can thus be effectively prevented.

In order to avoid stopping noises, it has proven to be advantageous when the piston and/or the end stops, on their sides facing each other in moving direction, are provided with elastomeric stopping buffers.

The preferred embodiments of the present invention will now be described with reference to the accompanying drawings.

DESCRIPTION OF THE PREFERRED EMBODIMENTS

Figure 1:
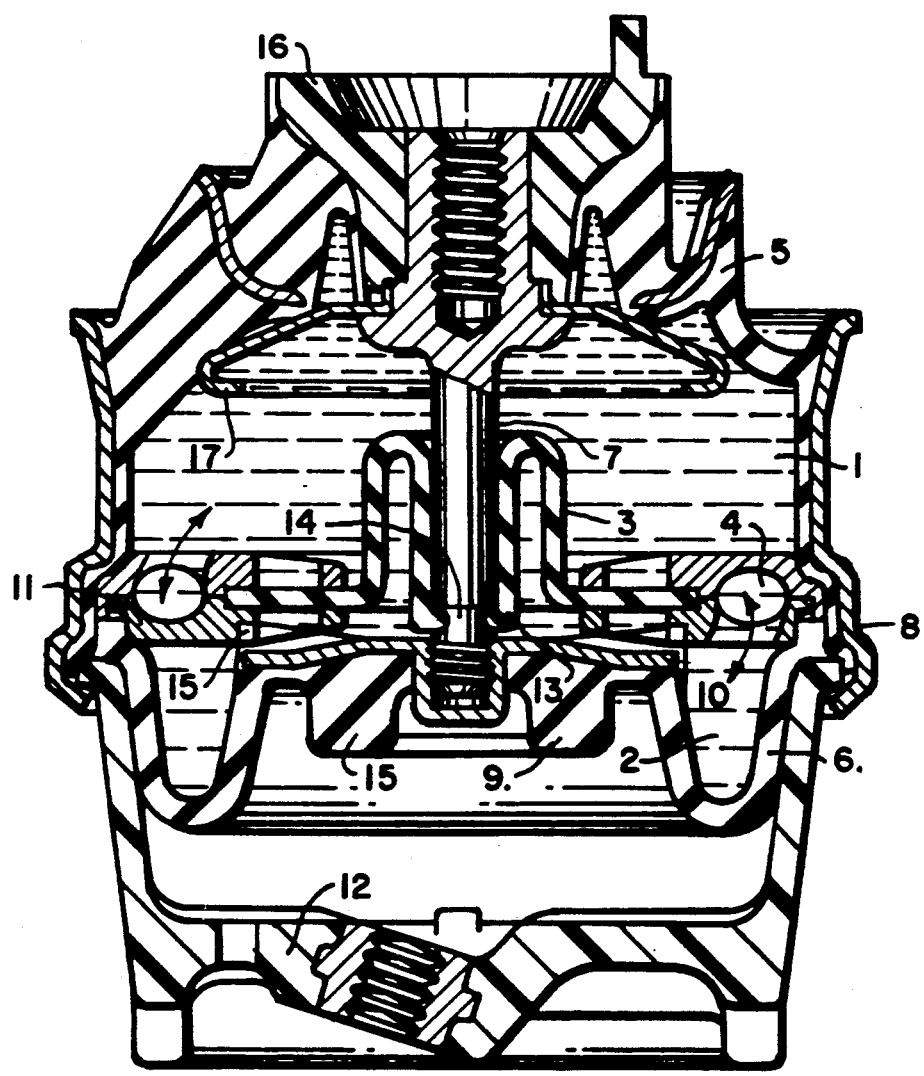
FIG. 1 is a longitudinal cross-sectional view of an engine mount according to a first preferred embodiment of the present invention.
Figure 2:
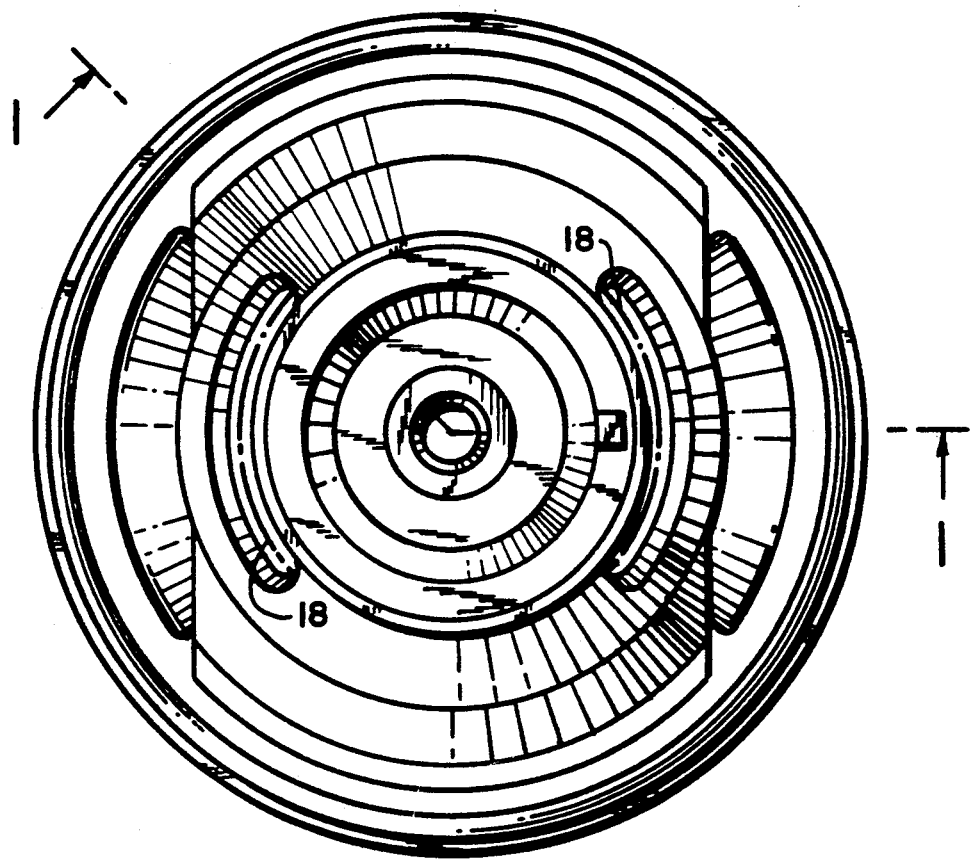
FIG. 2 is a top view of the engine mount of FIG. 1.

The engine mount represented in FIGS. 1 and 2 includes liquid-filled working and equalization chambers 1 and 2, respectively, which are separated by a resilient partition wall 3 and connected by means of a damping opening 4. The working chamber 1 and the equalization chamber 2, which oppose each other in the axial direction, are bounded by essentially non-deformable pistons 16, 9 each of which is connected to a centrally disposed, annular fitting 8 by means of a liquid-impermeable and elastically deformable annular body. The pistons 16, 9 are rigidly connected by means of a connecting rod 7 which penetrates the partition wall parallel to the axial direction in the area of an opening. The partition wall 3 is externally affixed to the fitting 8. The piston 9 bounding the equalizing chamber 2 has a piston surface which is at least as large as the piston surface of the partition wall 3. An annular body 6, which is provided in the area of the equalizing chamber 2 between the piston 9 and the fitting 8, is formed by a first rolling membrane which is curved in the axial direction toward the outside. The partition wall 3 is a second rolling membrane which is curved in the axial direction to extend into the working chamber 1. In the area of its opening, this membrane is affixed, liquid-tight, to the connecting rod 7, as indicated on the enlargement 13 received in a circumferential recess 14 in the rod 7. The piston 16 bounding the working chamber 1 is at the same time configured as a first support and is provided with an internal thread that serves the purpose of attaching the device to be supported, for example an internal combustion engine.

At the same time, the fitting 8 is configured as a second support and, in the bottom area, is provided with an internal thread. The latter serves to attach it to a corresponding base, such as a car body.

A hydrodynamic braking body 17, immersed in the working chamber 1, is additionally provided at the piston 16 bounding the working chamber 1 toward the exterior. This further improves the resulting damping action.

Toward the outside, the working chamber is bounded by a resilient annular body 5 which is able to solely bear the load to be supported. This annular body is provided with opposing, kidney shaped recesses 18 disposed transverse to the moving direction (see FIG. 2). From the top, they engage its profile and, in this direction, impart to it a greater resilience than in a direction extending transverse to this direction. A configuration of this kind is of great advantage when used in an engine mount of a motor vehicle.

The represented engine mount has a good cardanic resilience. High-frequency vibrations are well isolated even when the unit is tilted during assembly and low-frequency vibrations are well damped.

Figure 3:
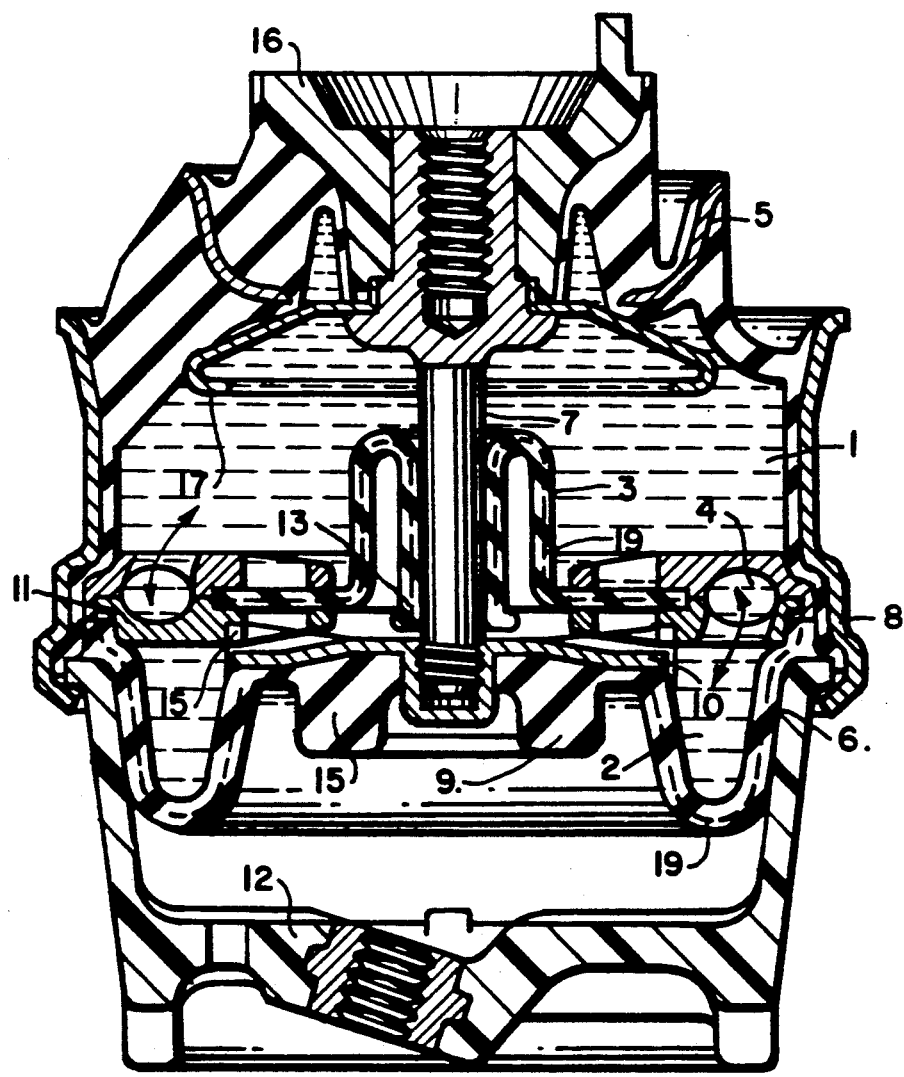
FIG. 3 is a longitudinal cross-sectional view of an engine mount according to a second preferred embodiment of the present invention.

The embodiment of an engine mount of FIG. 3 is distinguished from the embodiment of FIG. 1 and described above in that the first rolling membrane 6 and the second rolling membrane 3 are reinforced by means of highly-flexible material inserts 19. This prevents bursting when extremely elevated pressures occur in the interior of the engine mount. Moreover, the second rolling membrane 3 is provided with an enlargement 13 which contacts the connecting rod in the area of a cylindrical segment and which can be moved relative thereto in case of extreme excursions. The necessary elastic widening of the enlargement during the assembly can be determined by means of simple experiments. It ensures that damage to the engine mount is avoided even in case of extreme excursions of the parts connected by the engine mount. When the engine mount is used in a motor vehicle, such extreme excursions can be caused, for example, when the vehicle drives over a curb.

There has thus been shown and described a novel hydraulically damped engine mount which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. Al such changes, modifications, variations and other uses and applications which do not depart from the spirit and scope of the invention are deemed to be covered by the invention, which is to be limited only by the claims which follow.

What is claimed is:

1. In a hydraulically damped engine mount, comprising liquid-filled working and equalization chambers separated by a resilient partition wall and connected by a damping opening, wherein the axially opposing working chamber and the equalization chamber are bounded by essentially non-deformable pistons, the latter being connected to a centrally disposed, annular fitting by means of a liquid-impermeable and elastically deformable annular body, wherein these pistons are rigidly joined to one another by means of a connecting rod penetrating the partition wall parallel to the moving direction in the area of the damping opening and wherein the partition wall is externally affixed to the fitting, the improvement wherein the piston bounding the equalization chamber has a piston surface which is at least as large as the piston surface of the partition wall; wherein an annular body provided between this piston and the fitting is a rolling membrane which is curved in the axial direction toward the outside; wherein the partition wall is a second rolling membrane which is curved in the axial direction to extend into the working chamber; and wherein the second rolling membrane is affixed to the connecting rod in a liquid-tight manner in the area of the damping opening.

2. The engine mount in accordance with claim 1, wherein the piston and the first rolling membrane are configured so as to join one another as one piece.

3. The engine mount in accordance with claim 1, wherein the first rolling membrane is reinforced with an insert of material.

4. The engine mount in accordance with claim 1, wherein the piston is reinforced by means of a reinforcement.

5. The engine mount in accordance with claim 1, wherein the partition wall is bounded by an enlargement in the area of the opening, and wherein the enlargement is elastically widened and pressed against the connecting rod due to an internal prestress.

6. The engine mount in accordance with claim 5, wherein the enlargement contacts the connecting rod in the area of a groove having a matching profile.

7. The engine mount in accordance with claim 5, wherein the enlargement contacts the connecting rod in the area of a cylindrical segment extending parallel to the moving direction and wherein the enlargement can be moved relative to this segment in case of extreme excursions.

* * * * *